(12) United States Patent
Volkmann et al.

(10) Patent No.: US 9,854,027 B2
(45) Date of Patent: Dec. 26, 2017

(54) PROVIDING CLIENTS ACCESS TO A SERVER SERVICE USING AN OPC UNIFIED ARCHITECTURE (OPC-UA)

(75) Inventors: Frank Volkmann, Nuremberg (DE); Markus Erlmann, Mainleus (DE); Christian Hock, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 14/404,869

(22) PCT Filed: May 31, 2012

(86) PCT No.: PCT/EP2012/060260
§ 371 (c)(1),
(2), (4) Date: Dec. 1, 2014

(87) PCT Pub. No.: WO2013/178270
PCT Pub. Date: Dec. 5, 2013

(65) Prior Publication Data
US 2015/0156252 A1 Jun. 4, 2015

(51) Int. Cl.
*H04L 29/06* (2006.01)
*G06F 17/30* (2006.01)
(Continued)

(52) U.S. Cl.
CPC .............. *H04L 67/10* (2013.01); *G06F 9/542* (2013.01); *H04L 12/185* (2013.01);
(Continued)

(58) Field of Classification Search
CPC ....................................................... H04L 67/10
See application file for complete search history.

(56) References Cited

U.S. PATENT DOCUMENTS

| | | | | |
|---|---|---|---|---|
| 7,599,999 B1* | 10/2009 | Armstrong | .............. | G06F 9/544 709/213 |
| 2002/0010804 A1* | 1/2002 | Sanghvi | .................. | G06F 9/542 719/318 |

(Continued)

FOREIGN PATENT DOCUMENTS

| | | |
|---|---|---|
| CN | 1985309 | 6/2007 |
| WO | WO 2004003735 A2 | 1/2004 |

OTHER PUBLICATIONS

Leitner S.-H. et al; "OPC UA—Serviceedented Architecture for Industrial Applications"; In: Workshop der Fachgruppen Objekonentierte Softwareeritwicklung; pp. 1-6; XP007909798; Oct. 27, 2006.

(Continued)

*Primary Examiner* — Nicholas Taylor
*Assistant Examiner* — Sanjoy Roy
(74) *Attorney, Agent, or Firm* — Cozen O'Connor

(57) ABSTRACT

A method for providing clients with access to a service of a server in a network using an OPC-UA, the server service making available varying values of at least one variable to the clients, wherein a client registers for the server service by sending a subscription request for the server service to the server which sets up a subscription structure including a unique subscription ID as well as a TCP/IP multicast group associated with the subscription structure and including a unique multicast address, and there server communicates the multicast address and the subscription ID to every client submitting a subscription request to register for the server service, the server additionally sends each change in value of each variable of the server service to the multicast address over a network via a multicast message so that all clients registered for the server service receive the same multicast message.

9 Claims, 5 Drawing Sheets

(51) Int. Cl.
    *H04L 29/08*     (2006.01)
    *G06F 9/54*     (2006.01)
    *H04L 12/18*     (2006.01)

(52) U.S. Cl.
    CPC ............ *H04L 67/125* (2013.01); *H04L 67/42* (2013.01); *H04L 69/16* (2013.01); *G05B 2219/33149* (2013.01); *G05B 2219/34263* (2013.01)

(56) References Cited

U.S. PATENT DOCUMENTS

| | | | | |
|---|---|---|---|---|
| 2004/0006652 | A1* | 1/2004 | Prall | G06F 9/542 |
| | | | | 719/318 |
| 2010/0281097 | A1* | 11/2010 | Mahnke | H04L 12/403 |
| | | | | 709/201 |
| 2010/0306313 | A1* | 12/2010 | Mahnke | G06F 9/543 |
| | | | | 709/203 |

OTHER PUBLICATIONS

OPC Foundation; "OPC Alarms and Events"; OPC: Ole ofr Process control; Version 1.02; pp. 1-102; XP002295924; 1999; Nov. 2, 1999.

Myrda P.T. et al: "Recommended Approach to a NASPInet Architecture"; 45$^{th}$ IEEE Hawaii International Conference on System Science (HICSS); pp. 2072-2084; ISBN: 978-1-4577-1925-7; DOI: 10.1109/HICSS.2012.496; XP: 032113903; 2012; Jan. 4, 2012.

Office Action dated Nov. 28, 2016 which issued in the corresponding Chinese Patent Application No. 201280073591.4.

* cited by examiner

PROVIDING CLIENTS ACCESS TO A SERVER SERVICE USING AN OPC UNIFIED ARCHITECTURE (OPC-UA)

REFERENCE TO RELATED APPLICATIONS

This is a U.S. national stage of application No. PCT/EP2012/060260 filed 31 May 2012.

BACKGROUND OF THE INVENTION

1. Field of the Invention

The invention relates to a method for providing clients with access to a server service of a server in a network using an OPC UNIFIED ARCHITECTURE (OPC-UA).

2. Description of the Related Art

OPC Unified Architecture (OPC-UA) is a communication protocol and information model for communication between different automation components (devices).

In the case of OPC-UA, all communication relationships occur in a bilateral manner between two end points. In this case, an OPC-UA client establishes a communication channel to an OPC-UA server, and the entire communication between the two occurs within this channel. This applies, in particular, to all read and write access operations, which therefore also includes subscriptions in which clients are informed of value changes in variables.

In practice, the situation often occurs in which a plurality of clients are interested in the same information from a server. In the case of OPC-UA, each of the clients then establishes bilateral communication with the server and requests the same values as the other clients. Examples in which such a situation occurs are a plurality of HMI devices Human Machine Interface (HMI) devices that show the same view of a server state, historian applications, logging, state monitoring and parallel KPI creation Key Performance Indicator (KPI).

SUMMARY OF THE INVENTION

It is therefore an object of the invention to provide an improved hardware and a method for providing clients with access to a server service of a server, which provides the clients with varying values of at least one variable, in a network using an OPC-UA.

This and other objects and advantages are achieved in accordance with the invention by a method for providing clients with access to a server service of a server, which provides the clients with varying values of at least one variable, in a network using an OPC-UA, where a client registers for the server service by transmitting a subscription registration for the server service to the server. The server creates, for the server service, a subscription structure having a unique subscription ID, i.e., a unique identifier, and a Transmission Control Protocol (TCP), Internet Protocol TCP/IP multicast group which is associated with this subscription structure and has a unique multicast address, and communicates the multicast address and the subscription ID to each client registering for the server service via a subscription registration. The server transmits each value change in the value of each variable of the server service to the multicast address using a multicast message via the network, with the result that all clients registered for the server service receive the same multicast message.

In this case, the server creates a separate subscription structure and a separate TCP/IP multicast group in each case for different requested server services (subscriptions) of this type, i.e., for server services with different variables, in which case the subscription IDs and multicast addresses of different server services differ from one another.

Here and below, clients should always be understood as meaning OPC-UA clients and servers should always be understood as meaning OPC-UA servers.

The method in accordance with the invention expands the conventional OPC-UA specification with regard to the server services that are referred to as subscriptions in OPC-UA, in which clients are informed of value changes in variables, which are provided by a server and for which the clients register with the server. In accordance with the invention, the server sets up a multicast group in this case for different clients registering for the same subscription, i.e., for the same variables, and transmits value changes in these variables to the multicast group in the form of a multicast message in each case, with the result that all clients registered for the respective subscription receive the same multicast message.

The server therefore communicates a value change in a variable to all registered clients using a single multicast message, whereas, in the conventional OPC-UA, the server transmits a separate message to each registered client on its request (i.e., in response to a "Polled Refresh Request" which is used by the client to request the value of one or more variables from the server). This advantageously reduces the utilization of the server and of the network and increases the efficiency of subscriptions in comparison with the conventional OPC-UA.

In particular, the polled refresh requests from the clients registered with the server service can be dispensed with for the variables of the server service, i.e., these clients no longer need to request the current values of variables from the server since the server communicates value changes in the variables of a server service automatically and simultaneously to all clients registered for the server service using the multicast messages.

Nevertheless, client applications that produce polled refresh requests for variables of the server service do not need to be changed in comparison with the conventional OPC-UA because these polled refresh requests can be detected and intercepted by the OPC-UA communication stack of the client, with the result that they are not delivered to the server. Therefore, the OPC-UA communication stacks of the clients are preferably designed to detect and intercept such polled refresh requests produced by client applications.

In addition, the invention makes it possible to use OPC-UA at locations at which this is not possible with conventional OPC subscriptions, such as in some situations that can presently be achieved only with clocked communication because the automatic transmission of the multicast messages by the server can be adapted to the corresponding clocking.

In one preferred embodiment of the invention, the multicast messages transmitted by the server are User Datagram Protocol (UDP) messages.

UDP is a simple and connectionless network protocol and, as a result, is particularly advantageously suitable for easily and quickly transmitting multicast messages.

In order to register a client for the server service, another preferred embodiment of the invention provides for the OPC-UA communication stack of the client to insert a data item into the registration data transmitted to the server, which data item shows the client to be a client supporting multicast subscriptions.

The data item can be used to inform the server of the willingness of a client to join a multicast group. The insertion of the data item by the OPC-UA communication stack of the client is advantageous because the subscription method in accordance with the invention can thereby remain transparent to client applications, with the result that these applications do not need to be changed in comparison with the conventional OPC-UA. As a result, the expansion of the OPC-UA in accordance with the invention can be restricted, on the client side, to an expansion of the functionality of its OPC-UA communication stack.

Furthermore, the server preferably generates the subscription structure and the TCP/IP multicast group after receiving a subscription registration for the server service for the first time. As a result, the subscription structure and the TCP/IP multicast group are produced when necessary. This is advantageous because it is generally not possible to predict which subscriptions are requested by the clients and, in particular, no unnecessary subscription structure and the TCP/IP multicast group are created.

Furthermore, after receiving a subscription registration from a client for the server service, the server preferably checks whether a subscription structure already exists for the server service and creates a subscription structure for the server service only if a subscription structure does not yet exist for the server service.

This advantageously avoids subscription structures being repeatedly created and the server and the network being unnecessarily loaded.

In another embodiment of the invention, the multicast message is repeatedly transmitted by the server.

This is advantageous, in particular, when the multicast messages are transmitted in a non-secure manner, in which case the loss of individual multicast messages is accepted and is not checked. In such cases, the repeated transmission of a multicast message can advantageously increase the certainty of the delivery of the multicast message.

Another embodiment of the invention provides for the set of variables of the server service to be formed, by the server, as a combination set of variables that are contained in subscription registrations from different clients that are received by the server.

As a result, it is advantageously possible to take into account the fact that different clients generally do not request exactly the same subscriptions. In this case, subscriptions that differ only slightly (in terms of a few variables) can be combined by forming the combination set of variables, with the result that a common subscription structure and a multicast group are created for them. In this case, a degree of correspondence between different subscriptions, up to which these subscriptions are combined or above which a new subscription structure and a new multicast group are created, is preferably defined.

Hardware in accordance with the invention is configured to implement the method in accordance with the invention with the above-mentioned advantages.

Accordingly, a client in accordance with the invention has an OPC-UA communication stack which is configured to insert a data item into registration data that are transmitted to the server and are intended to register the client for the server service, which data item shows the client to be a client supporting multicast subscriptions.

A server in accordance with the invention has an OPC-UA server stack which is configured to create, for the server service, a subscription structure having a unique subscription ID and a TCP/IP multicast group which is associated with this subscription structure and has a unique multicast address, to communicate the multicast address and the subscription ID to each client registering for the server service by means of a subscription registration, and to transmit each value change in the value of each variable of the server service to the multicast address using a multicast message via the network.

OPC-UA clients and servers in accordance with the invention therefore differ from conventional OPC-UA clients and servers only by additional functions of their OPC-UA communication stacks. This has the advantages that the additional functions are completely backwards compatible with conventional OPC-UA clients and servers and are transparent to the servers and applications of clients and servers do not need to be changed in comparison with the conventional OPC-UA.

A network in accordance with the invention comprises at least one client in accordance with the invention and at least one server in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved become clearer and more distinctly comprehensible in connection with the following description of exemplary embodiments which are explained in more detail in connection with the drawings, in which.

DETAILED DESCRIPTION OF THE EXEMPLARY EMBODIMENTS

Mutually corresponding parts are provided with the same reference symbols, in all figures.

Figure 1:
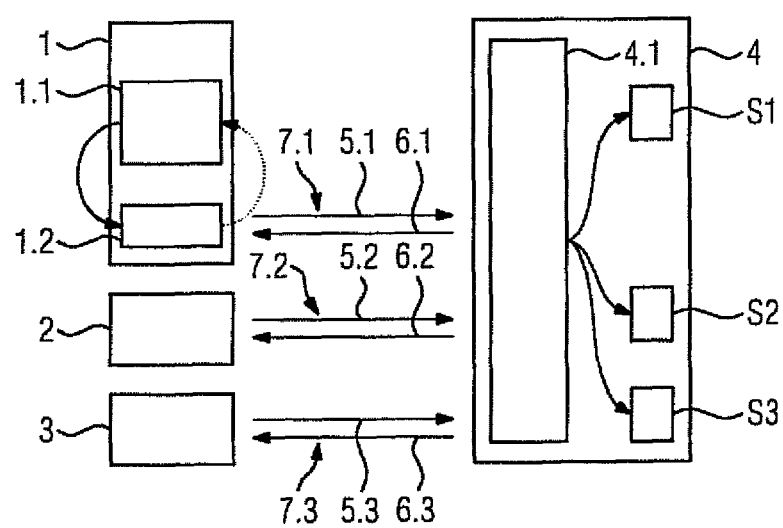
FIG. 1 shows registration of a plurality of clients for a server service of a server in a network using an OPC-UA in accordance with the prior art.

FIG. 1 shows registration of a plurality of clients 1, 2, 3 for the same server service of a server 4 in a network using an OPC-UA in accordance with the prior art. The server service provides the clients 1, 2, 3 with varying values of one or more variables. In order to register for the server service, each client 1, 2, 3 establishes a communication channel 7.1, 7.2, 7.3 to the server 4 according to the OPC-UA and transmits a subscription registration 5.1, 5.2, 5.3 (subscriber call) to the server 4 via its communication channel 7.1, 7.2,

7.3. In this case, each communication channel 7.1, 7.2, 7.3 is in the form of a TCP connection.

The subscription registration 5.1, 5.2, 5.3 defines the requested server service by virtue of the fact that it contains the variables, in the value changes of which the client 1, 2, 3 is interested, and an update rate which indicates a desired interval of time between updates of the values of these variables. For this purpose, the subscription registration 5.1, 5.2, 5.3 calls the CreateSubscription method in the server 4 and states the variables and the update rate as arguments of the method. For the three variables var1, var2, var3 and an update rate of 250 ms, the subscription registration 5.1, 5.2, 5.3 contains the CreateSubscription (var1, var2, var3, 250 ms) method call, for example.

This is illustrated in greater detail for a first client 1 in FIG. 1. An application 1.1 of the first client 1 generates the request for the subscription registration 5.1 of the first client 1 and transfers it to an OPC-UA communication stack 1.2 of the first client 1 which then transmits the subscription registration 5.1 to the server 4. The subscription registrations 5.2, 5.3 of the other clients 2, 3 are generated and transmitted in a corresponding manner.

The server 4 receives the subscription registrations 5.1, 5.2, 5.3 for the clients 1, 2, 3 via a server stack 4.1, creates a separate subscription structure S1, S2, S3 for each client 1, 2, 3 registering with the server service in this manner and manages the subscription structure. The server 4 uses the subscription structures S1, S2, S3 to generate a separate subscription ID for the server service for each client 1, 2, 3 registering with the server service and transmits this ID to the respective client 1, 2, 3 via the respective communication channel 7.1, 7.2, 7.3 using a separate subscription notification 6.1, 6.2, 6.3 (subscriber response).

As illustrated again using the example of the first client 1 in FIG. 1, the OPC-UA communication stack 1.2 of the first client 1 receives the subscription notification 6.1 from the server 4, which was transmitted to the first client 1, and transfers the subscription ID contained in the subscription notification 6.1 to that application 1.1 of the first client 1 that requested the subscription registration 5.1. A corresponding situation applies to the further clients 2, 3 registering for the server service.

Figure 2:
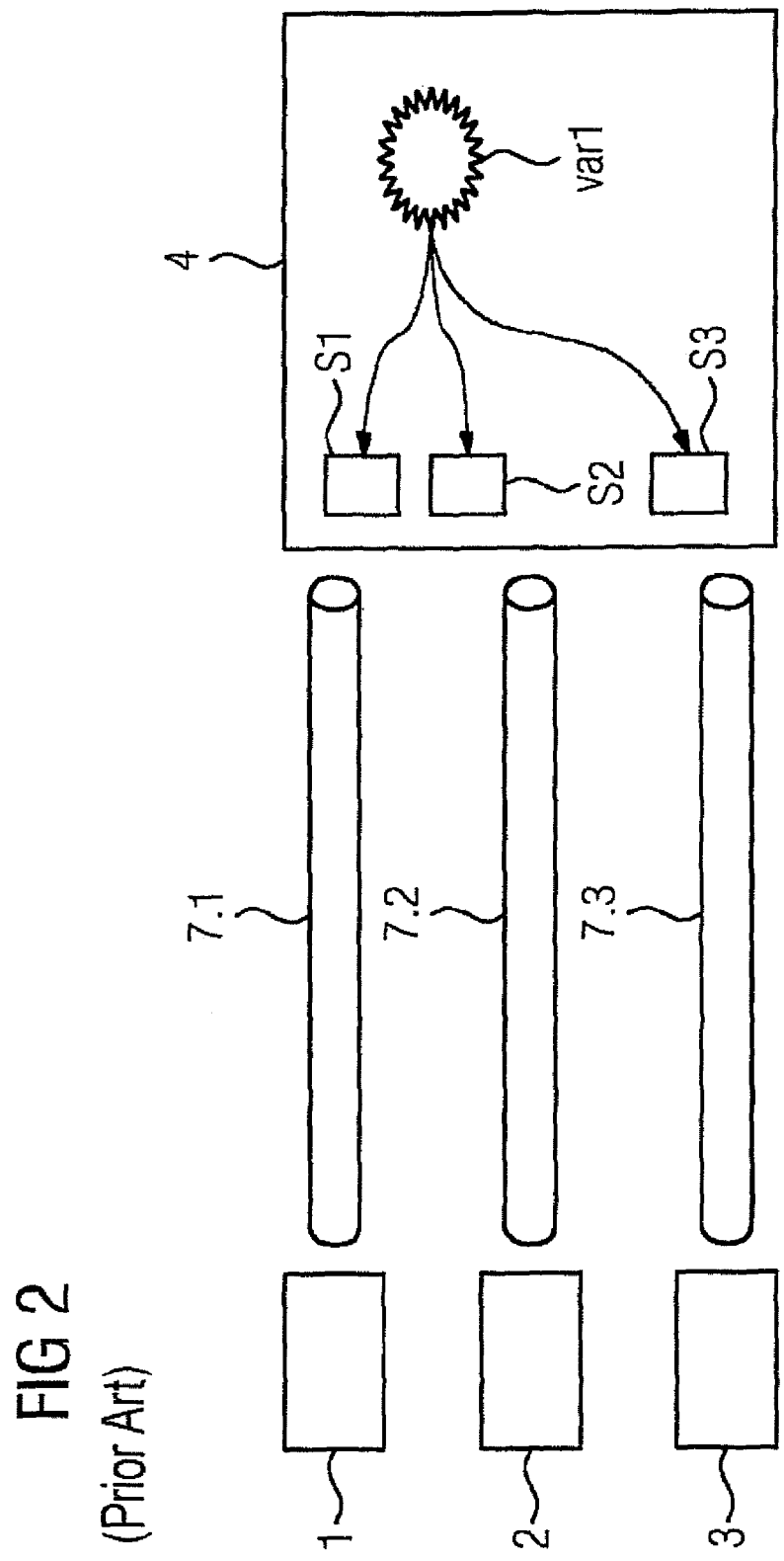
FIG. 2 shows communication of a value change in a variable to clients registered for a server service in a network using an OPC-UA in accordance with the prior art.

FIG. 2 shows, by way of example, communication of a value change in a variable var1 of the server service to clients 1, 2, 3 registered for the server service using an OPC-UA in accordance with the prior art. The server 4 determines the subscription structures S1, S2, S3 affected by the value change and transmits a separate TCP value change message (subscriber publish) to each client 1, 2, 3 of a determined affected subscription structure S1, S2, S3 via the respective communication channel 7.1, 7.2, 7.3, which value change message communicates the value change in the first variable var1 to the client 1, 2, 3.

Figure 3:
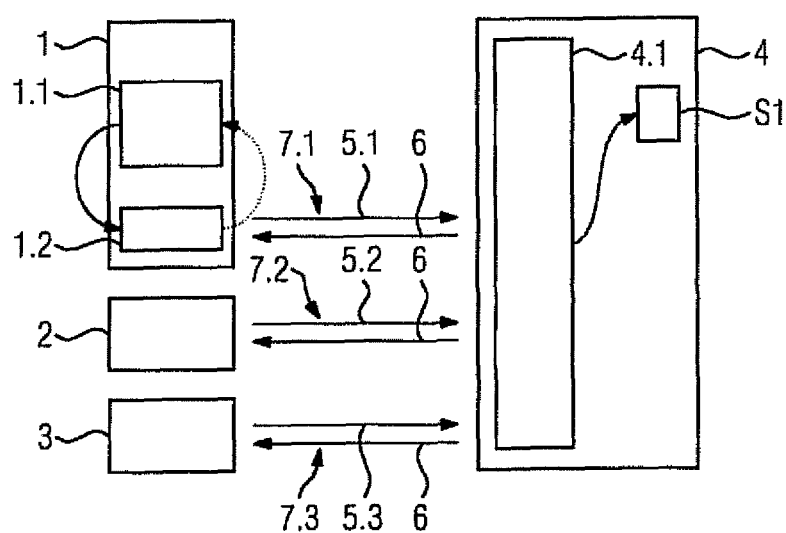
FIG. 3 shows registration of a plurality of clients for a server service of a server in a network using an OPC-UA in accordance with the method of the invention.

FIG. 3 shows registration of a plurality of clients 1, 2, 3 for the same server service of a server 4 in a network using an OPC-UA in accordance with the method of the invention. Like in the conventional method described using FIGS. 1 and 2, the server service provides the clients 1, 2, 3 with varying values of one or more variables. In order to register for the server service, each client 1, 2, 3 again establishes a communication channel 7.1, 7.2, 7.3 in the form of a TCP connection to the server 4 according to the OPC-UA and transmits a subscription registration 5.1, 5.2, 5.3 (subscriber call) to the server 4 via its communication channel 7.1, 7.2, 7.3.

Like in the conventional method, the subscription registration 5.1, 5.2, 5.3 defines the requested server service by virtue of the fact that it contains the variables, in the value changes of which the client 1, 2, 3 is interested, and an update rate which indicates a desired interval of time between updates of the values of these variables. For this purpose, the subscription registration 5.1, 5.2, 5.3 calls the CreateSubscription method in the server 4 and states the variables and the update rate as arguments of the method. For the three variables var1, var2, var3 and an update rate of 250 ms, the subscription registration 5.1, 5.2, 5.3 again contains the CreateSubscription (var1, var2, var3, 250 ms) method call, for example.

This is illustrated in greater detail for a first client 1 in FIG. 3. An application 1.1 of the first client 1 generates a request for the subscription registration 5.1 of the first client 1 and transfers it to an OPC-UA communication stack 1.2 of the first client 1. In contrast to the conventional method, the OPC-UA communication stack 1.2 of the first client 1 adds a data item to the subscription registration 5.1, the data item showing the first client 1 to be a client 1, 2, 3 supporting multicast subscriptions, and then transmits this data item to the server 4 together with the subscription registration 5.1. The subscription registrations 5.2, 5.3 for the other clients 2, 3 are generated in a corresponding manner, are supplemented with a data item that shows that the respective client 2, 3 supports multicast subscriptions, and are transmitted to the server 4.

The server 4 receives the subscription registrations 5.1, 5.2, 5.3 for the clients 1, 2, 3 via a server stack 4.1. After receiving a subscription registration 5.1, 5.2, 5.3 for the server service for the first time, the server 4 uses the data item that shows the support of multicast subscriptions to identify the expanded functionality of the client 1, 2, 3 transmitting the subscription registration 5.1, 5.2, 5.3, then creates a subscription structure S1 having a unique subscription ID for the server service and a TCP/IP multicast group 9 that is associated with the subscription ID and has a unique multicast address, and transmits this subscription ID and multicast address to the registering client 1, 2, 3 using a subscription notification 6 (subscriber response) via the client's communication channel 7.1, 7.2, 7.3 to the server 4.

If the server 4 receives further subscription registrations 5.1, 5.2, 5.3 for the same server service, it does not generate any further subscription structure S1, S2, S3, but rather communicates the subscription ID of the subscription structure S1 that has already been created and the multicast address of the associated multicast group 9 to each further client 1, 2, 3 registering for the server service via the respective communication channel 7.1, 7.2, 7.3 using a subscription notification 6.

In contrast to the conventional method, the server 4 therefore generates only a single subscription structure S1 for the server service in the method in accordance with the invention and creates a multicast group 9 for the clients 1, 2, 3 registering for the server service. The subscription notifications 6 transmitted to the clients 1, 2, 3 therefore all contain the same subscription ID for identifying the server service or the subscription structure S1 and the same multicast address of the associated multicast group 9.

As illustrated using the example of the first client 1 in FIG. 3, the OPC-UA communication stack 1.2 of the first client 1 receives the subscription notification 6 from the server 4, which was transmitted to the first client 1, and transfers the subscription ID contained in the subscription notification 6 to that application 1.1 of the first client 1 that requested the subscription registration 5.1. In contrast, the multicast address is not communicated to the application 1.1, i.e., the fact that only one subscription structure S1 is generated remains hidden to the application 1.1. Therefore, for the application 1.1, there is no difference between the conventional subscription method and the subscription method in accordance with the invention, with the result that it does not have to be changed in any way in comparison with the conventional subscription method when using the subscription method in accordance with the invention. A corresponding situation applies to the further clients 2, 3 registering for the server service.

Figure 4:
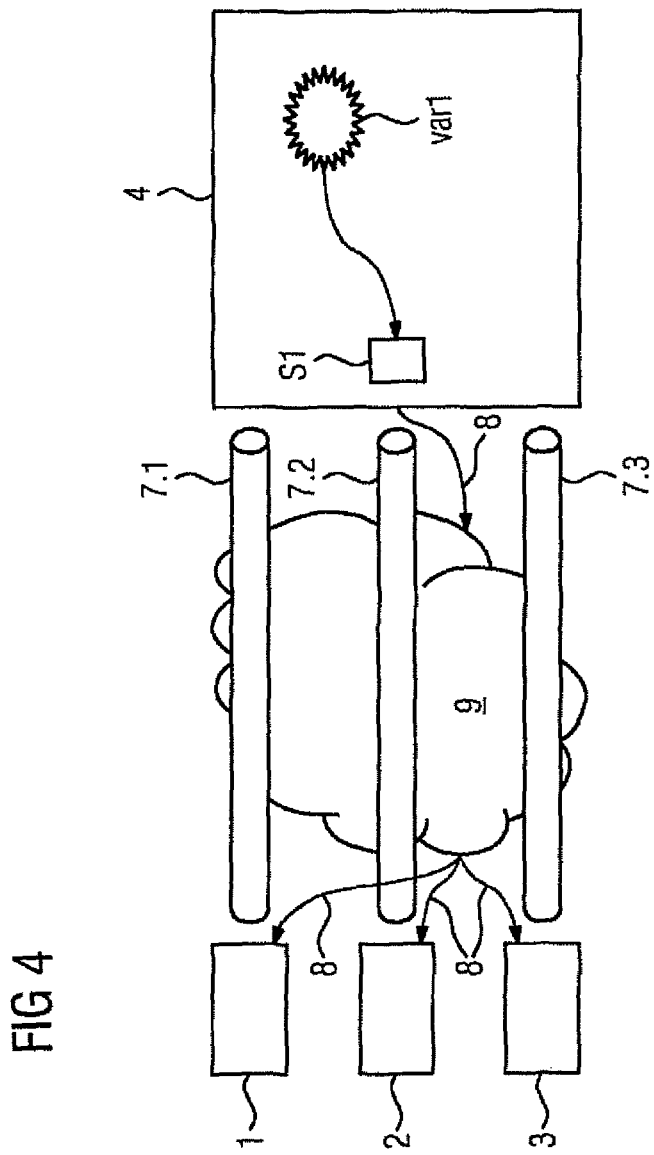
FIG. 4 shows communication of a value change in a variable to clients registered for a server service in a network using an OPC-UA in accordance with the method of the invention.
Figure 5:
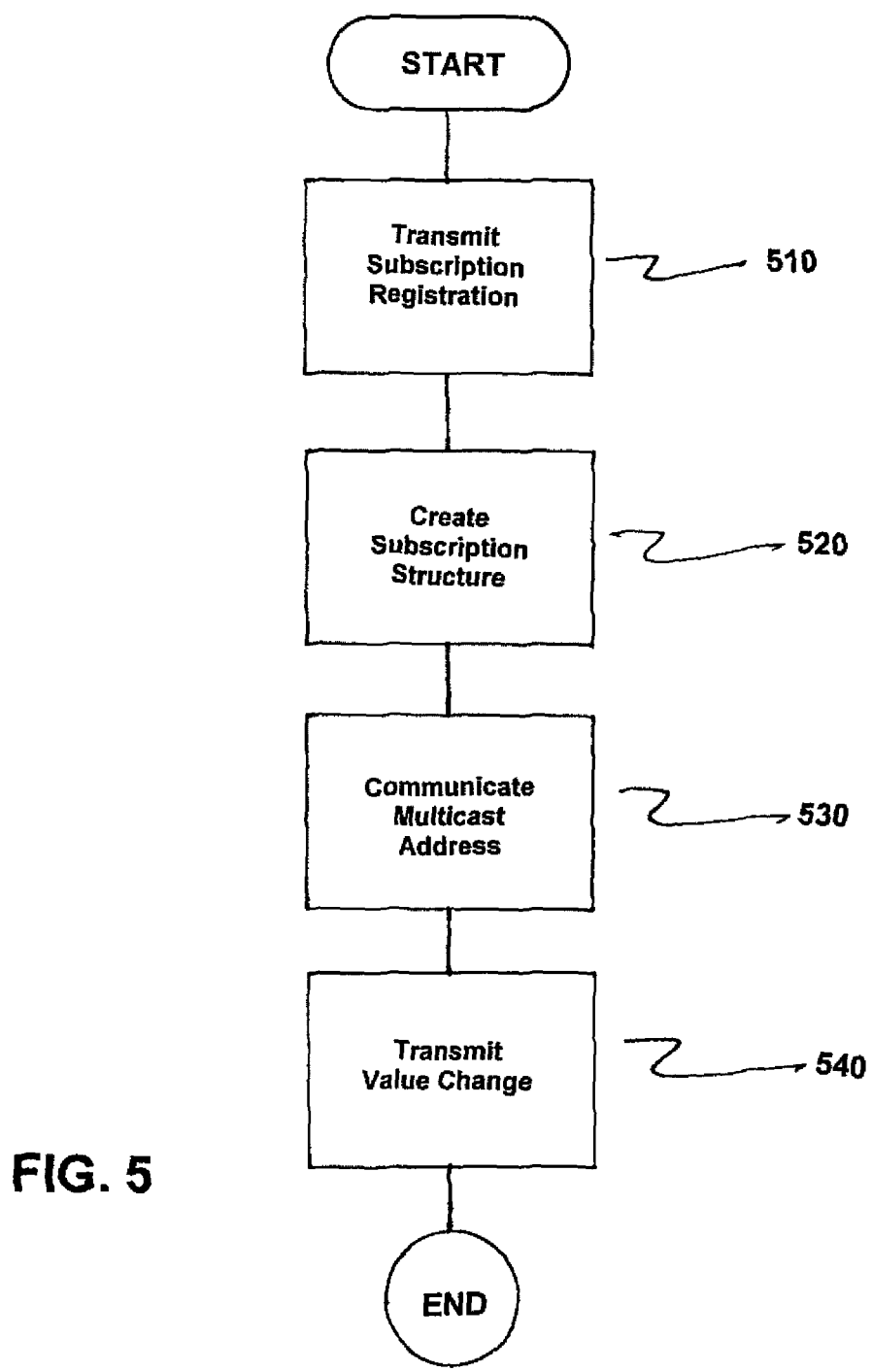
FIG. 5 a flowchart of the method in accordance with the invention.

FIG. 4 shows communication of a value change in a variable var1 to clients registered for a server service in a network using an OPC-UA in accordance with the method of the invention.

The server 4 determines the subscription structures S1 affected by the value change, only one subscription structure S1 being affected in this example. For each determined affected subscription structure S1, the server 4 generates precisely one multicast message 8 (subscriber publish) that contains the value change in the variable var1 and is in the form of a UDP message. This multicast message 8 is transmitted to the multicast address of that multicast group 9 that is associated with the respective subscription structure S1, with the result that all clients 1, 2, 3 belonging to this multicast group 9 receive the same multicast message 8.

A value change in the variable var1 is therefore transmitted to all clients 1, 2, 3 registered for the server service via a single multicast message 8, whereas the server 4 transmits a separate TCP value change message to each client 1, 2, 3 registered for the server service in the conventional method.

Although the invention was illustrated and described in detail by means of a preferred exemplary embodiment, the invention is not restricted by the disclosed examples and other variations can be derived therefrom by a person skilled in the art without departing from the scope of protection of the invention.

FIG. 4 is a flowchart of a method for providing clients (1, 2, 3) with access to a server service of a server (4) in a network using an OPC Unified Architecture (OPC-UA), where the server service provides the clients (1, 2, 3) with varying values of at least one variable (var1). The method comprises transmitting a subscription registration (5.1, 5.2, 5.3) for the server service to the server (4) to register a client (1, 2, 3) for the server service, as indicated in step 510.

Next, the server (4) creates, for the server service, a subscription structure (S1, S2, S3) having a unique subscription ID and a Transmission Control Protocol/Internet Protocol (TCP/IP) multicast group (9) associated with this subscription structure (S1, S2, S3) and having a unique multicast address, as indicated in step 520.

The multicast address and the subscription ID are communicated from the server (4) to each client (1, 2, 3) registering for the server service via a subscription registration (5.1, 5.2, 5.3), as indicated in step 530.

Each value change in a value of each variable (var1) of the server service is then transmitted from the server (4) to the multicast address using a multicast message (8) via the network such that all clients (1, 2, 3) registered for the server service receive the same multicast message (8), as indicated in step 540.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing clients with access to a server service of a server in a network using an OPC Unified Architecture, the server service providing the clients with varying values of at least one variable, the method comprising:

transmitting a subscription registration for the server service to the server to register a client for the server service;

creating, by the server, for the server service, a subscription structure having a unique subscription ID and a Transmission Control Protocol/Internet Protocol multicast group associated with this subscription structure and having a unique multicast address;

communicating the multicast address and the subscription ID from the server to each client registering for the server service via the transmitted subscription registration; and transmitting each value change in a value of each variable of the server service from the server to the multicast address using a multicast message via the network such that all clients registered for the server service receive the same multicast message;

wherein an OPC-UA communication stack of the client inserts a data item into registration data transmitted to the server, which data item indicates the client is a client supporting multicast subscriptions, in order to register a client for the server service.

2. The method as claimed in claim 1, wherein the multicast messages transmitted by the server are User Datagram Protocol messages.

3. The method as claimed in claim 1, wherein the server generates the subscription structure and the TCP/IP multicast group after initially receiving a subscription registration for the server service.

4. The method as claimed in claim 1, wherein, after receiving the subscription registration from the client for the server service, the server checks whether the subscription structure already exists for the server service and creates the subscription structure for the server service only if the subscription structure does not yet exist for the server service.

5. The method as claimed in claim 1, wherein the multicast message is repeatedly transmitted by the server.

6. The method as claimed in claim 1, wherein a set of variables of the at least one variable of the server service is formed, by the server, as a combination set of variables which are contained in subscription registrations from different clients received by the server.

7. A client having an OPC-UA communication stack which is configured to insert a data item into registration data which are transmitted to the server and which are intended to register the client for a server service, the data item indicating the client is a client supporting multicast subscriptions in order to register the client for the server service.

8. A server having an OPC-UA server stack which is configured to create, for the server service, a subscription structure having a unique subscription ID and a Transmission Control Protocol/Internet Protocol multicast group which is associated with this subscription structure and which has a unique multicast address, configured to communicate the multicast address and the subscription ID to each client registering for the server service via a subscription registration, and configured to transmit each value change in a value of each variable of the server service to the unique multicast address using a multicast message via a network;

wherein an OPC-UA communication stack of each client inserts a data item into registration data transmitted to the server, which data item indicates the client is a client supporting multicast subscriptions, in order to register each client for the server service.

9. A network comprising:

at least one client having an OPC-UA communication stack which is configured to insert a data item into registration data which are transmitted to the server and which are intended to register the client for the server service, the data item indicating the client is a client supporting multicast subscriptions in order to register a client for the server service; and at least one server having an OPC-UA server stack which is configured to create, for the server service, a subscription structure having a unique subscription ID and a Transmission Control Protocol/Internet Protocol multicast group which is associated with this subscription structure and which has a unique multicast address, configured to communicate the multicast address and the subscription ID to each client registering for the server service via a subscription registration, and configured to transmit each value change in a value of each variable of the server service to the unique multicast address using a multicast message via a network.

\* \* \* \* \*